July 5, 1938. E. J. McMAHON 2,123,141
FISHING REEL
Filed Dec. 31, 1934
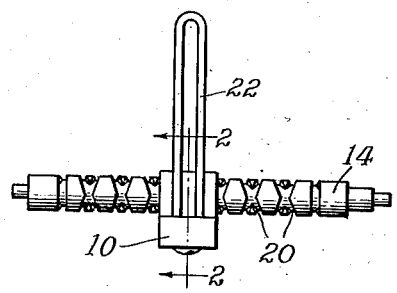
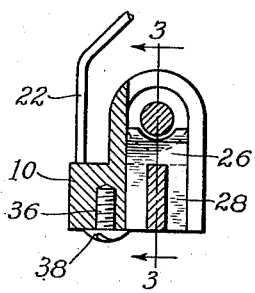
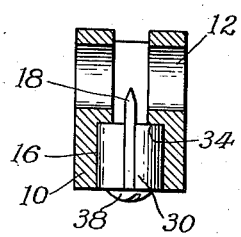
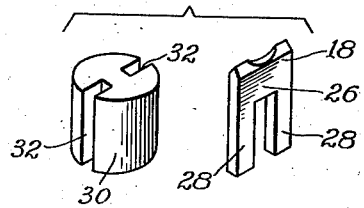
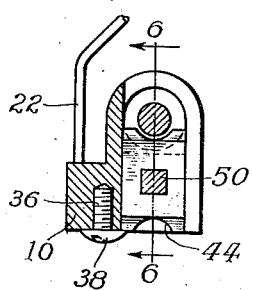
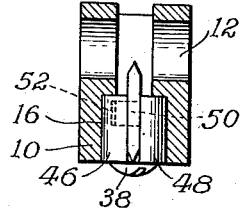
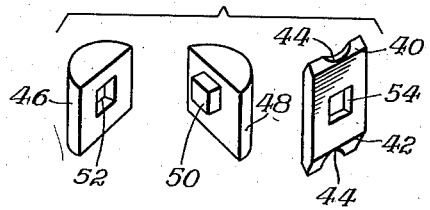
Inventor:
Edward J. McMahon
By Freeman and Sweet
Attorneys Patented July 5, 1938

2,123,141

UNITED STATES PATENT OFFICE 2,123,141

FISHING REEL

Edward J. McMahon, Bronson, Mich., assignor to Bronson Reel Company, Bronson, Mich., a corporation of Michigan Application December 31, 1934, Serial No. 759,876

9 Claims. (Cl. 242—84.4)

My invention relates to fishing reels and includes among its objects and advantages a reduction in cost and increase in efficiency, durability, and ease of replacement in level winding attachments for such reels.

In the accompanying drawing:

Figure 1 is a front view of the customary carriage and shaft assembly constituting the level winding attachment for a fishing reel;

Figure 2 is a section on line 2—2 of Figure 1;

Figure 3 is a section on line 3—3 of Figure 2;

Figure 4 is a prospective view of the blade and blade holder of Figures 2 and 3 placed side by side ready for assembly;

Figure 5 is a section on the same plane as Figure 2 indicating an alternative type of pawl assembly;

Figure 6 is a section on line 6—6 of Figure 5; and

Figure 7 is a perspective view of the parts of the pawl assembly of Figures 5 and 6 with the parts placed side by side ready to be assembled.

In the embodiment of the invention selected for illustration in Figures 2 to 4, inclusive, the carriage 10 is a metal body having a longitudinal bore at 12 to receive the drive shaft 14 and a transverse bore at 16 to receive a pawl assembly including a thread-engaging portion 18 adapted to enter the threads 20 in the drive shaft 14 and move the carriage laterally from side to side as the shaft 14 is rotated. I have illustrated a carriage equipped with the usual thread-guiding loop 22. The pawl assembly of Figures 2 and 3 includes a blade member comprising the thread engaging portion 18 and a U-shaped body 26 having spaced legs 28. The blade holder is a cylindrical metal body 30 having grooves at 32 to receive the legs 28. The upper end of the holder 30 abuts at 34 against a shoulder in the bore 16, and the lower end has been illustrated as substantially flush with the lower surface of the carriage 10.

I have illustrated means for retaining the holder 30 against downward movement from the position of Figure 2 in the nature of a threaded screw 36, the head 38 of which projects under the end of the holder 30.

Referring now to the embodiment of Figures 5, 6, and 7, the carriage 10 is present in the identical form previously discussed and illustrated. The blade has been formed with two oppositely disposed thread-engaging terminal portions 40 and 42, each having the same prongs separated by the concave portion 44 as in Figure 4. The holder 30 has been formed in two separable halves 46 and 48. A lug 50 on the holder portion 48 and a pocket 52 in the portion 46 serve to connect the two parts together to move when in assembled position as a unitary whole. The blade is centrally apertured at 54 to receive the lug 50. Accordingly, by placing first the blade and then the portion 46 over the lug 50 the assembly of the pawl unit is complete, and its insertion into the bore 16, as shown in Figures 5 and 6, followed by screwing home the same retaining screw 36 completes the assembly of Figures 5 and 6.

As distinguished from a one piece construction, the construction disclosed has the advantage that the blade, being a separate piece of metal, can have a different chemical analysis and heat treatment from the metal of the blade holder. This makes it possible to use for the blade holder a metal that will give the best wearing qualities and lowest coefficient of friction in slow speed oscillatory sliding contact with the chamber walls. Similarly, I can use for the blade a metal, heat treated or otherwise, that will develop the best wearing qualities and lowest coefficient of friction in its entirely different high speed sliding contact with the walls of the shaft threads 20. It will be noted that the conditions of lubrication for the two sets of sliding surface areas are as radically different as the loads and surface speeds, which makes the ability to select the materials independently all the more vital to best results.

Because the blade is thin and flat, a replacement blade can be enclosed in a small envelope and the envelope pasted in place in the box in which the reel is sold, much more compactly, conveniently, and reliably than with the one piece cylindrical pawls common in the prior art.

The embodiment of Figures 5 to 7, inclusive, has the further advantage that removal of the pawl assembly from the carriage permits the blade to be reversed and assembled again, thus doubling the life of a single blade and, to a very considerable extent, rendering the supplying of a replacement blade unnecessary.

This application is a continuation-in-part of my copending application Serial No. 633,794, filed September 19, 1932, now Patent No. 2,080,428, issued May 18, 1937.

Without further elaboration, the foregoing will so fully explain my invention that others may, by applying knowledge current at the time of application, readily adapt the same for use under various conditions of service.

I claim:

1. In a level winding attachment for fishing reels: a rotary shaft having direction-reversing propelling threads thereon; a carriage having a bore receiving said shaft and slidable along said shaft; line guiding means on said carriage; said carriage having a cylindrical bore at right angles to the shaft axis and intersecting said shaft axis; a pawl assembly including a holder having peripheral sliding contact with the cylindrical wall of said bore, and a blade supported by said holder; said blade having oppositely disposed thread engaging portions and being adjustably mounted in said holder to present different thread engaging portions in position to engage said threads, and retaining means removably assembled with said carriage to retain said holder against axial movement away from said shaft, removal of said retaining means and holder permitting access to said blade to adjust the position of said blade with respect to the holder and present a different thread engaging portion to said propelling threads, said retaining means permitting said holder to rotate about its own axis to permit said blade to follow said threads.

2. A combination according to claim 1 in which the bore receiving the pawl assembly is reduced to a slot adjacent the shaft, thereby leaving a web having end abutment on one side with the end of said pawl holder, and sliding contact on the other side with said shaft.

3. In a level winding attachment for fishing reels: a rotary shaft having direction-reversing propelling threads thereon; a carriage having a bore receiving said shaft and slidable along said shaft; line guiding means on said carriage; said carriage having a cylindrical bore at right angles to the shaft axis and intersecting said shaft axis; a pawl assembly including a holder having peripheral sliding contact with the cylindrical wall of said bore, and a blade supported by said holder; said blade having oppositely disposed thread engaging portions and being adjustably mounted in said holder to present different thread engaging portions in position to engage said threads, and retaining means removably assembled with said carriage to retain said holder against axial movement away from said shaft.

4. In a level winding attachment for fishing reels: a rotary shaft having direction-reversing propelling threads thereon; a carriage having a bore receiving said shaft and slidable along said shaft; line guiding means on said carriage; said carriage having a cylindrical bore at right angles to the shaft axis and intersecting said shaft axis; a pawl assembly including a blade holder having peripheral sliding contact with the cylindrical wall of said bore, and a blade supported by said holder; said blade having oppositely disposed thread engaging portions and being substantially symmetrical with respect to a transverse plane midway between said portions, said blade holder including a portion presenting a surface parallel to the blade axis and abutting a blade portion to restrain the blade from moving away from the shaft.

5. A combination according to claim 4 in which the holding portion forming the abutment for the blade is a transverse lug passing through a central hole in the blade.

6. The combination in a fishing reel having a reversibly threaded line guide carriage traversing shaft, of a line guide carriage operatively associated therewith, a longitudinally slotted cylindrical pawl carrier removably mounted on said carriage for rotative movement, and a pawl disposed in said slot in said pawl carrier and supported thereby in operative relation with said shaft, said pawl having a plurality of shaft engaging faces whereby the pawl may be selectively positioned to bring a selected face into operative relation to the shaft.

7. In a level winding attachment for fishing reels; a rotary shaft having direction-reversing propelling threads thereon; a carriage having a bore receiving said shaft and slidable along said shaft; line guiding means on said carriage; said carriage having a cylindrical bore at right angles to the shaft axis and intersecting said shaft axis; a pawl assembly including a holder having peripheral sliding contact with the cylindrical wall of said bore, and a blade supported by said holder; said blade having oppositely disposed thread engaging portions and being adjustably mounted in said holder to present different thread-engaging portions in position to engage said threads, and retaining means removably assembled with said carriage to retain said holder against axial movement away from said shaft, the inactive thread-engaging portion of said blade being housed within the contour of said holder.

8. In a level winding attachment for fishing reels; a rotary shaft having direction-reversing propelling threads thereon; a carriage having a bore receiving said shaft and slidable along said shaft; line guiding means on said carriage; said carriage having a cylindrical bore at right angles to the shaft axis and intersecting said shaft axis; a pawl assembly including a holder having peripheral sliding contact with the cylindrical wall of said bore, and a blade supported by said holder; said blade having oppositely disposed thread engaging portions and being adjustably mounted in said holder to present different thread engaging portions in position to engage said threads, and retaining means removably assembled with said carriage to retain said holder against axial movement away from said shaft, said blade and holder having cooperating abutting faces to hold said blade against axial movement away from said shaft.

9. In a level winding attachment for fishing reels: a rotary shaft having direction-reversing propelling threads thereon; a carriage having a bore receiving said shaft and slidable along said shaft; a rotary holder removably mounted in said carriage for rotation about an axis normal to the shaft axis, and a flat thread-engaging blade removably mounted in said holder; said blade having a plurality of similarly shaped thread-engaging portions, and said blade and holder having interengaging portions shaped and arranged to hold said blade in any one of a plurality of different preselected positions, in each of which positions one of said thread-engaging portions is engaged with said shaft.

EDWARD J. McMAHON.